United States Patent
Ballagh et al.

(10) Patent No.: US 7,346,482 B1
(45) Date of Patent: Mar. 18, 2008

(54) SHARED MEMORY FOR CO-SIMULATION

(75) Inventors: Jonathan B. Ballagh, Longmont, CO (US); Roger B. Milne, Boulder, CO (US); Nabeel Shirazi, San Jose, CA (US); Joshua Ian Stone, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 303 days.

(21) Appl. No.: 11/075,340

(22) Filed: Mar. 8, 2005

(51) Int. Cl.
 *G06F 17/50* (2006.01)
(52) U.S. Cl. .......................... 703/14; 703/13
(58) Field of Classification Search ............ 703/13–22
 See application file for complete search history.

(56) References Cited

U.S. PATENT DOCUMENTS

| | | | |
|---|---|---|---|
| 3,601,809 A | 8/1971 | Gray et al. | |
| 5,019,968 A | 5/1991 | Wang et al. | |
| 5,111,413 A | 5/1992 | Lazansky et al. | |
| 5,768,567 A * | 6/1998 | Klein et al. | 703/13 |
| 5,771,370 A * | 6/1998 | Klein | 703/13 |
| 5,870,588 A | 2/1999 | Rompaey et al. | |
| 6,026,421 A | 2/2000 | Sabin et al. | |
| 6,212,489 B1 * | 4/2001 | Klein et al. | 703/13 |
| 6,389,383 B1 | 5/2002 | Sarathy et al. | |
| 6,473,841 B1 * | 10/2002 | Ueda et al. | 711/156 |
| 6,651,225 B1 | 11/2003 | Lin et al. | |
| 6,701,501 B2 | 3/2004 | Waters et al. | |
| 6,754,763 B2 | 6/2004 | Lin | |
| 7,007,261 B1 | 2/2006 | Ballagh et al. | |
| 7,124,376 B2 | 10/2006 | Zaidi et al. | |
| 2002/0120909 A1 | 8/2002 | Brouchard et al. | |
| 2003/0144828 A1 | 7/2003 | Lin | |
| 2004/0181385 A1 * | 9/2004 | Milne et al. | 703/14 |
| 2004/0260528 A1 * | 12/2004 | Ballagh et al. | 703/14 |
| 2005/0165597 A1 * | 7/2005 | Nightingale | 703/27 |
| 2006/0174221 A1 | 8/2006 | Kinsella et al. | |

OTHER PUBLICATIONS

U.S. Appl. No. 10/949,049, filed Sep. 24, 2004, Milne et al.
Lt. Rick Miller; "C++ Arrays—Part 1"; [Verified by Wayback Machine, Apr. 2001]1 pp. 1-4.
Reggie Huff; "RAM is Not an Acronym"; [Verified by Wayback Machine, Jan. 2002]; pp. 1-5.
"FIFO Queing Discipline"; [Verified by Wayback Machine, 2003]; pp. 1-3.

* cited by examiner

*Primary Examiner*—Paul Rodriguez
*Assistant Examiner*—Eunhee Kim
(74) *Attorney, Agent, or Firm*—LeRoy D. Maunu (57) ABSTRACT

Co-simulation of a circuit design includes simulating a first subset of blocks of the circuit design on a software-based co-simulation platform, simulating a second subset of the blocks of the circuit design on a hardware-based co-simulation platform, and maintaining coherency for a memory block of the circuit design between a first representation of data in the memory block on the software-based co-simulation platform and a second representation of the data in the memory block on the hardware-based co-simulation platform. Coherency is maintained by managing mutually exclusive access to the memory block from the first subset of blocks and the second subset of blocks.

20 Claims, 5 Drawing Sheets

SHARED MEMORY FOR CO-SIMULATION

FIELD OF THE INVENTION

The present invention generally relates to using shared memory in co-simulation of a circuit design.

BACKGROUND

During the process of developing a circuit design, the behavior of the design is simulated based on a specification of the circuit design. Simulating the design helps to verify correct behavior prior to physical implementation of the circuit. Wasted manufacturing costs due to faulty design may thereby be avoided.

Numerous tools are available for simulating circuit designs including, for example, high-level modeling systems (HLMSs). Co-simulation may also be used when the design may be more efficiently simulated by simulating different parts of the design on different simulation platforms ("co-simulation platforms").

Example co-simulation platforms include both software-based and hardware-based systems. In a software-based system, a portion of the design is emulated with software running on a workstation, for example. In a hardware-based system, a portion of the design is emulated on a hardware platform that includes a programmable logic device (PLD), such as a field programmable gate array (FPGA). Co-simulation using a hardware platform may reduce the time required for a simulation run. The Modelsim simulator and the NC-SIM simulator from Cadence are example software-based systems, and the Wildcard development platform from Annapolis Microsystems and the Benone development platform from Nallatech are example hardware-based systems. The WildCard and Benone platforms are often used for algorithm exploration and design prototyping.

Most design tools recognize and support a hierarchical specification of the design, which allows the design to be specified and viewed at different levels of abstraction. The term "block" is sometimes used to refer to a collection of parts of a design that perform a function. Blocks consume inputs and produce outputs as a function of internal state, blocks are connected by arcs, and arcs conduct data between blocks. At some level in this hierarchical framework, simulating the design involves moving data from one block of the design to another block of the design.

An HLMS, such as System Generator for DSP (Sysgen) HLMS, may permit a block of a circuit design to be translated into PLD configuration data that may be used to configure a hardware-based co-simulation platform. The HLMS may include a "hardware co-simulation block" as a proxy for the hardware-based co-simulation platform. Like other blocks of the circuit design, the hardware co-simulation block consumes inputs and produces outputs. The hardware co-simulation block transfers the inputs for the block from the HLMS to the hardware-based co-simulation platform and transfers the outputs of the block from the hardware-based co-simulation platform to the HLMS.

The transfer of data, such as input values and output values for a block, between the HLMS and the hardware-based co-simulation platform may have substantial overhead, such as software overhead to setup the data transfer and hardware overhead to perform the data transfer. Multiple transactions may be required to transfer data for each HLMS simulation cycle, and each transaction typically may transfer a small amount of data, such as 32 bits.

The overhead associated with the data transfer between the HLMS and the hardware-based co-simulation platform often limits the performance for the simulation. For example, performance may be severely impacted in simulating a system requiring large amounts of data transfer, such as real-time signal processing applications including video and image processing.

The present invention may address one or more of the above issues.

SUMMARY OF THE INVENTION

The various embodiments of the invention provide a method and apparatus for simulation a circuit design using shared memory. In one embodiment, a method for co-simulating a circuit design includes simulating a first subset of blocks of the circuit design on a software-based co-simulation platform and simulating a second subset of the blocks of the circuit design on a hardware-based co-simulation platform. The data in a memory block of the circuit design has a first representation on the software-based co-simulation platform and a second representation on the hardware-based co-simulation platform. Coherency is maintained for the data in the memory block between the first and second representations.

In another embodiment, a co-simulation system, which includes a software-based co-simulation platform and a hardware-based co-simulation platform, is used to simulate a circuit design. The software-based co-simulation platform includes a first memory arrangement used to represent a memory block of the circuit design. The software-based co-simulation platform simulates at least one first block of the circuit design including simulating accesses from the at least one first block to data for the memory block using the first memory arrangement and manages mutually exclusive access to the memory block from the at least one first block and a second block of the circuit design. The hardware-based co-simulation platform includes a second memory arrangement also used to represent the memory block. The hardware-based co-simulation platform simulates the second block including simulating accesses from the second block to the data for the memory block using the second memory arrangement.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments of the invention, a circuit design is simulated with certain blocks of the circuit design simulated on a hardware-based co-simulation platform and other blocks simulated in software, such as an HLMS, on a software platform, such as a general purpose computer. The blocks simulated on the hardware-based co-simulation platform and the blocks simulated on the software platform may each access the data in a memory block, with the access to the data in the memory block being mutually exclusive between the block simulated on the hardware-based co-simulation platform and the block simulated on the software platform.

To provide local access to the data in the memory block, a hardware representation of the data in the memory block is maintained on the hardware-based co-simulation platform and a software representation of the data in the memory block is maintained on the software platform. During mutually exclusive access by the hardware-based co-simulation platform, the hardware-based co-simulation platform accesses the hardware representation. During mutually exclusive access by the software platform, the software platform accesses the software representation.

The data in the memory block is synchronized between the hardware and software representation for changes in the mutually exclusive access between the hardware-based co-simulation platform and the software platform. Prior to the hardware-based co-simulation platform obtaining mutually exclusive access, certain data in the memory block is transferred from the software representation to the hardware representation. In addition, prior to the software platform obtaining mutually exclusive access, certain data in the memory block is transferred from the hardware representation to the software representation. The data transferred includes at least the data that was modified since the prior data synchronization, but may also include some or all of the data that was not modified since the prior data synchronization.

Figure 1:
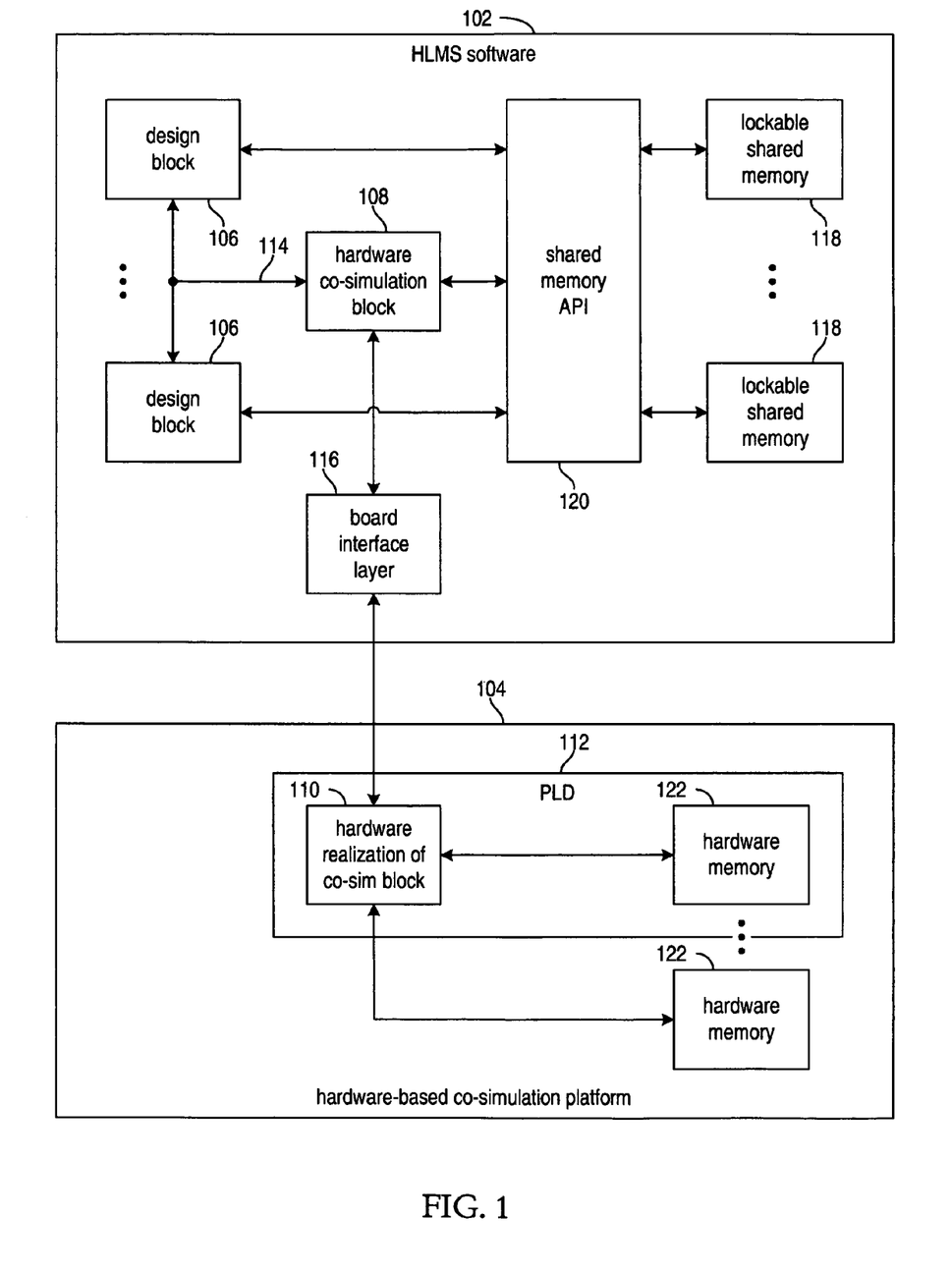
FIG. 1 is a block diagram of a simulation arrangement including an HLMS and a hardware-based co-simulation platform, according to various embodiments of the invention.

FIG. 1 is a block diagram of a simulation arrangement including an HLMS 102 and a hardware-based co-simulation platform 104, according to various embodiments of the invention. The HLMS 102 and the hardware-based co-simulation platform 104 cooperate to perform a simulation of a circuit design.

The circuit design includes design blocks 106 and a co-simulation block having a proxy, hardware co-simulation block 108, in the HLMS 102 and having hardware realization 110 in PLD 112 on the hardware-based co-simulation platform 104. The HLMS 102 simulates design blocks 106 in software on a general purpose computer or a collection of networked computers and the co-simulation block is simulated in hardware by realization 110 on the hardware-based co-simulation platform 104.

Inputs and outputs for the blocks of the circuit design may be communicated during simulation by signals represented by lines 114. The hardware co-simulation block 108 acts as a proxy in HLMS 102 for the hardware realization 110 of the co-simulation block. The inputs on lines 114 for the co-simulation block are received by the hardware co-simulation block 108 and sent to the hardware realization 110 of the co-simulation block via board interface layer 116. The outputs of the hardware realization 110 of the co-simulation block are sent via board interface layer 116 to the hardware co-simulation block 108, which transmits the outputs on lines 114.

In addition to communication using signals on lines 114, the design blocks 106 and the hardware co-simulation block 108 may communicate during simulation using shared memory blocks, such as lockable shared memory blocks 118. Shared memory blocks, such as 118, can be accessed by design blocks 106 and hardware co-simulation block 108 via the application programming interface (API) 120 for shared memory. Shared memory blocks 118 may be locked for exclusive access by one of the design blocks 106 or the hardware co-simulation block 108.

For further information on the shared memory API, refer to the co-pending, commonly assigned U.S. patent application Ser. No. 10/949,049 titled, "Shared Memory Interface for Use in Electronic Design Simulation," by Roger B. Milne et al. and filed Sep. 24, 2004, the contents of which are incorporated herein by reference.

Each lockable shared memory block 118 may have a corresponding hardware memory 122 in the hardware-based co-simulation platform 104. The data for a lockable shared memory 118 may be duplicated in the corresponding hardware memory 122, allowing the hardware realization 110 of the co-simulation block to access the same data from a hardware memory 122 that a design block 106 can access from the corresponding lockable shared memory block 118. Thus, a lockable shared memory block 118 provides a local copy for the HLMS 102 of data in a memory block of the circuit design and a hardware memory 112 provides a local copy for the hardware-based co-simulation platform 104 of the data in the memory block.

Because there are two copies 118 and 122 of the data for a memory block, data synchronization is required to maintain data coherency. To maintain data coherency, the data from a lockable shared memory block 118 may be transferred to the corresponding hardware memory 122 before the hardware realization 110 of the co-simulation block begins accessing the hardware memory 122, and subsequently the data from the hardware memory 122 may be transferred back to the lockable shared memory block 118 after the hardware realization 110 of the co-simulation block completes accessing the hardware memory 122. The data transfer in each direction may be a burst data transfer to efficiently utilize the communication link 124, such as PCI or USB, between the HLMS computer 102 and the hardware-based co-simulation platform 104.

It will be appreciated that certain memory blocks of the circuit design may be accessed only from design blocks 106, and thus do not need to be duplicated in hardware memories 122. In addition, a hardware memory 122 may be comprised of memory resources within PLD 112, an external memory device, or various combinations thereof.

Figure 2:
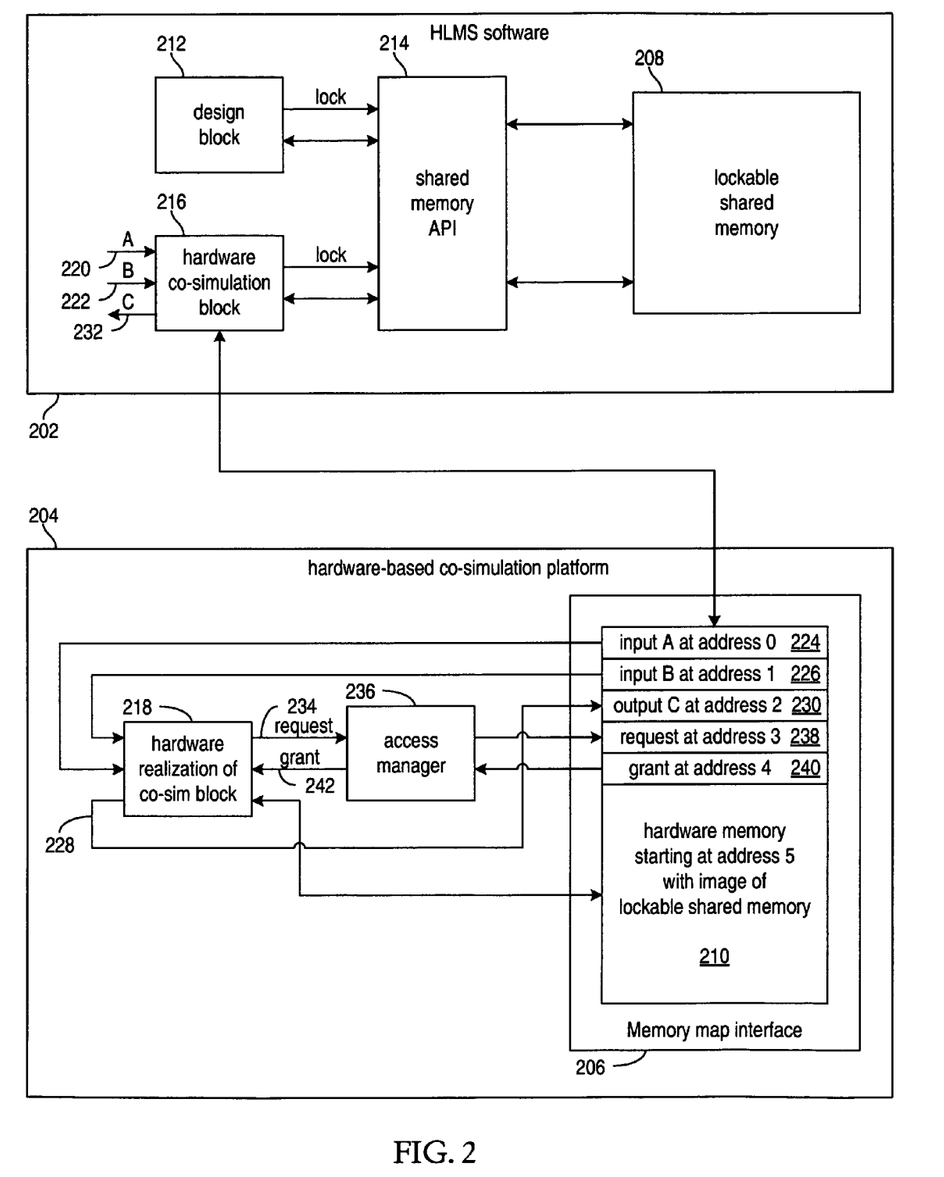
FIG. 2 is a block diagram of a simulation arrangement in which an HLMS and a hardware-based co-simulation platform use a memory map interface to manage a memory block, according to various embodiments of the invention.

FIG. 2 is a block diagram of a simulation arrangement in which an HLMS 202 and a hardware-based co-simulation platform 204 use a memory map interface 206 to manage a memory block, according to various embodiments of the invention. The data in the memory block is duplicated in the lockable shared memory block 208 and the hardware memory 210 in the memory map interface 206, for example, starting at address five.

During simulation, design block 212 accesses the lockable shared memory block 208 via the shared memory API 214 and the design block 212 should lock the lockable shared memory block 208 before access. The lock enforces mutually exclusive access to the lockable shared memory block 208, for example, the design block 212 may not obtain the lock from the shared memory API 214 if the lockable shared memory block 208 is already locked by the hardware co-simulation block 216. Conversely, the hardware co-simulation block 216 may not obtain the lock from the shared memory API 214 if the lockable shared memory block 208 is already locked by the design block 212. If the lockable shared memory block 208 is already locked, a block 212 or 216 requesting the lock may not obtain the lock until the lock is released. Typically, a block 212 or 216 releases the lock when the block has completed accessing the lockable shared memory 208.

Hardware co-simulation block 216 acts as a proxy in the HLMS 202 for the hardware realization 218 of the co-simulation block. During simulation, the hardware co-simulation block 216 receives inputs, for example inputs A and B on lines 220 and 222 respectively, from simulation blocks, such as design block 212. The hardware co-simulation block 216 forwards the values of the inputs on lines 220 and 222 to locations zero (224) and one (226) of the memory map interface 206, and locations zero and one are connected to the hardware realization 218 of the co-simulation block as corresponding inputs. During simulation, the hardware realization 218 of the co-simulation block may generate output values, for example the output on line 228 sent to location two 230 in memory map interface 206. The hardware co-simulation block 216 may read location two 230 of the memory map interface 206 and forward the value to the output C on line 232.

To access the data in the memory block, the hardware realization 218 of the co-simulation block sends a request on line 234 via access manager 236 to location three (238) in the memory map interface 206. In response to reading the request from location three 238 in the memory map interface 206, the hardware co-simulation block 216 locks the lockable shared memory block 208. The locking of the lockable shared memory block 208 by the hardware co-simulation block 216 may be delayed if the lockable shared memory 208 is already locked. After acquiring the lock to the lockable shared memory block 208, the hardware co-simulation block 216 reads the data from the lockable shared memory block 208, and forwards the data to the hardware memory 210 in the memory map interface 206. The data read and/or forwarded may be limited to a subset of the data in the lockable shared memory block 208 that includes modified data, as is later discussed in detail. After the data forwarding is complete, the hardware co-simulation block 216 sends a grant to location four 240 of memory map interface 206. The hardware realization 218 of the co-simulation block receives the grant on line 242 via the access manager 236.

On receiving the grant on line 242, the hardware realization 218 of the co-simulation block may process the data in the hardware memory 210. After completing the processing of the data in the hardware memory 210, the hardware realization 218 of the co-simulation block sends a released request on line 234 via access manager 236 to location three 238 in the memory map interface 206. In response to reading the released request from location three 238 in the memory map interface 206, the hardware co-simulation block 216 reads the data from the hardware memory 210 in the memory map interface 206, and forwards the data to the lockable shared memory block 208. The data read and/or forwarded may be limited to a subset of the data in the lockable shared memory block 208 that includes modified data, as is later discussed in detail. After the data forwarding is complete, the hardware co-simulation block 216 unlocks the lockable shared memory 208 and sends a released grant to location four 240 of memory map interface 206. The hardware realization 218 of the co-simulation block receives a released grant on line 242 from the access manager 236, as is later discussed in detail in connection with FIG. 4.

Figure 3:
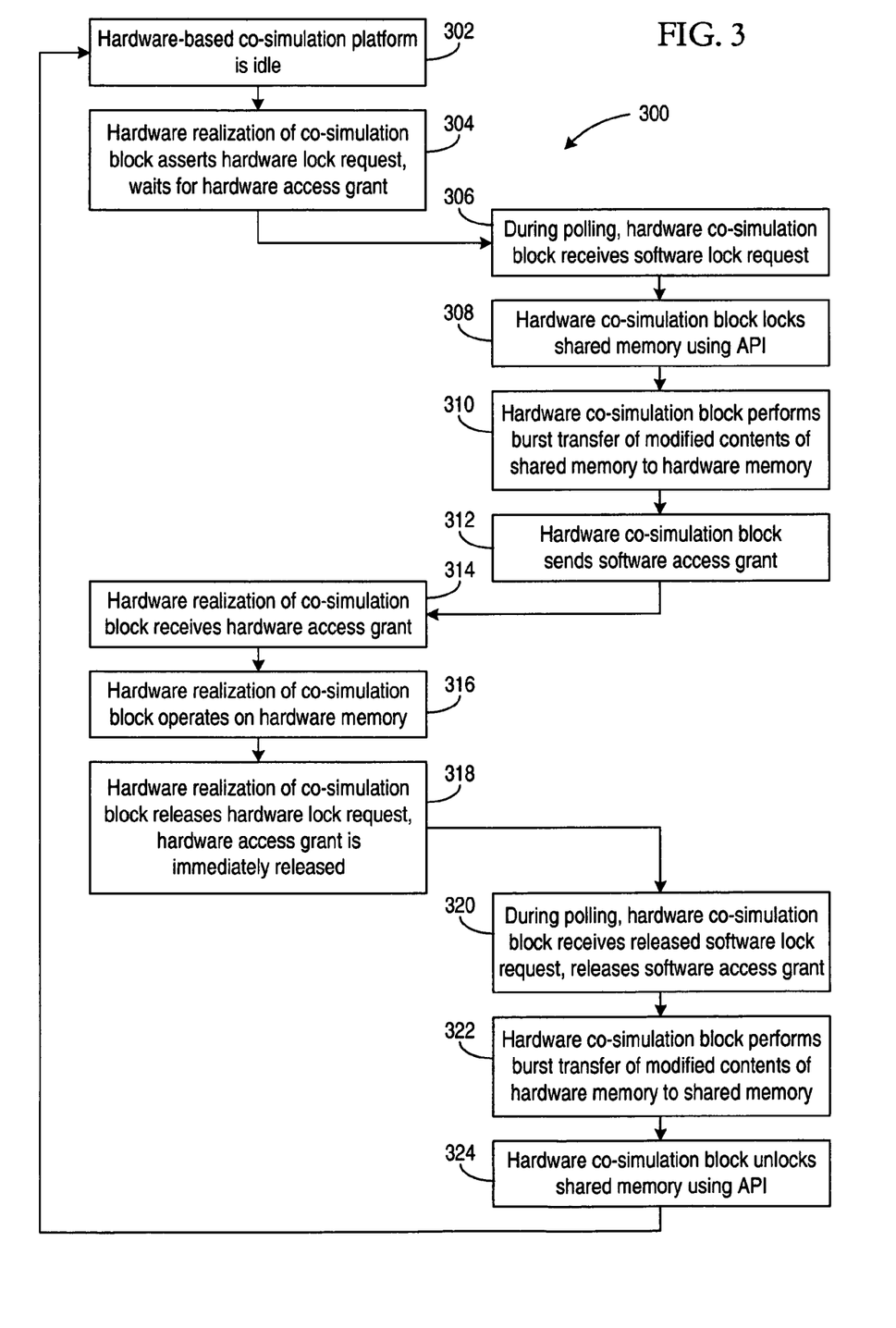
FIG. 3 is a flow diagram of an example parallel process for accessing shared memory during co-simulation, according to various embodiments of the invention.

FIG. 3 is a flow diagram of an example parallel process 300 for accessing shared memory during co-simulation, according to various embodiments of the invention. Steps 302, 304, 314, 316, and 318 are performed by a hardware-based co-simulation platform and steps 306, 308, 310, 312, 320, 322, and 324 are performed by HLMS software on a general purpose computer. It will be appreciated that parallel process 300 may be readily extended to multiple shared memories.

At step 302, the hardware-based co-simulation platform is idle. At step 304, the hardware realization of the co-simulation block requests access to the data in a memory block by asserting a hardware lock request. The hardware realization of the co-simulation block waits to receive a hardware access grant before accessing the data for the memory block in a hardware memory.

At step 306, the hardware co-simulation block in the HLMS actively polls for a software lock request. On receiving a software lock request resulting from the hardware lock request, the HLMS proceeds to step 308. At step 308, the hardware co-simulation block locks the shared memory using a shared memory API. The lock may not be obtained immediately if the shared memory is already locked. On obtaining the lock for the shared memory, the HLMS proceeds to step 310. It will be appreciated that the HLMS may be performing a portion of the simulation including accessing the shared memory in parallel with steps 306 and 308, and the HLMS may be performing a portion of the simulation that does not access the shared memory in parallel with steps 306, 308, 310, 312, 320, 322, and 324.

At step 310, the hardware co-simulation block performs data synchronization between the shared memory block and the hardware memory in the hardware-based co-simulation platform. After data synchronization, the software memory and the hardware memory contain coherent data. Generally, the data synchronization transfers to the hardware memory at least the data modified by the HLMS in the shared memory since the previous data synchronization. Typically, the transfer uses a burst data transfer, such as transferring values for multiple memory locations in each of one or more transactions. At step 312, the hardware co-simulation block sends a software grant to the hardware-based co-simulation platform.

At step 314, the hardware realization of the co-simulation block receives a hardware grant resulting from the software grant, enabling the hardware realization of the co-simulation block to process the data in the hardware memory at step 316. At step 318, the hardware realization of the co-simulation block releases the hardware lock request. Typically, the hardware access grant received by the hardware realization of the co-simulation block is immediately released.

At step 320, the hardware co-simulation block in the HLMS actively polls for a released software lock request. On receiving a released software lock request corresponding to the released hardware lock request, the HLMS proceeds to step 322. At step 322, the hardware co-simulation block performs data synchronization between the shared memory and the hardware memory. After data synchronization, the software memory and the hardware memory contain corresponding data values. Generally, the data synchronization transfers to the shared memory at least the data modified by the hardware realization of the co-simulation block in the hardware memory since the previous data synchronization.

Typically, the transfer uses a burst data transfer. At step 324, the hardware co-simulation block unlocks the shared memory using the shared memory API.

Figure 4:
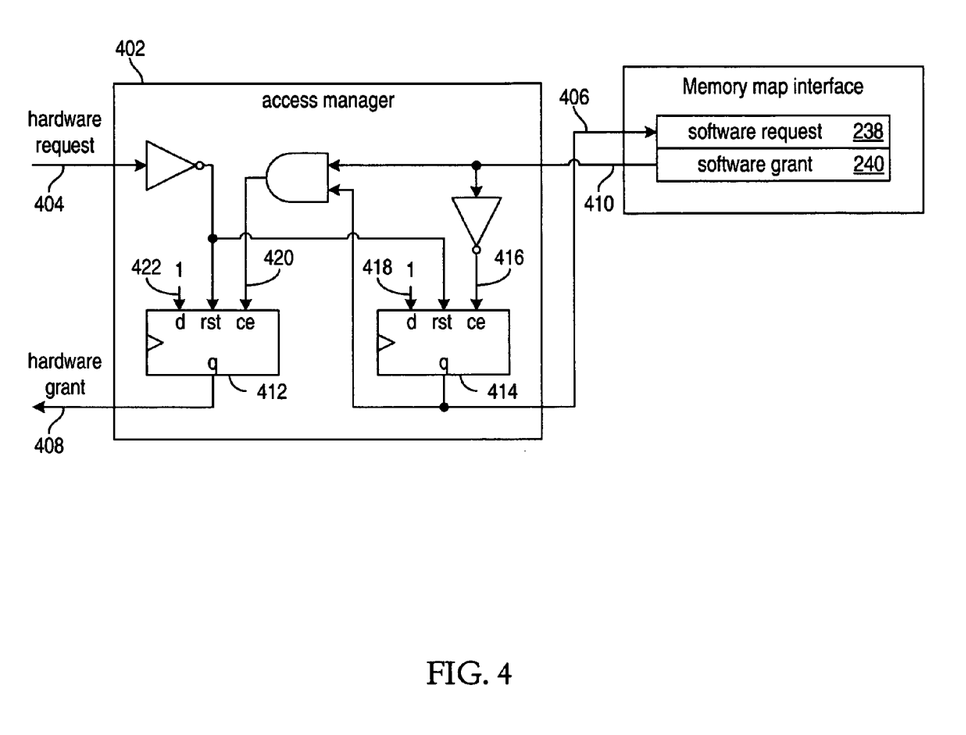
FIG. 4 is a block diagram of an access manager for managing access request and grant signals, according to various embodiments of the invention.

FIG. 4 is a block diagram of an access manager 402 for managing access request and grant signals on lines 404, 406, 408, and 410, according to various embodiments of the invention. Access manger 402 is one example of access manager 236 in FIG. 2. The access manager 402 propagates the hardware access request on line 404 into a corresponding software access request on line 406, while generating a hardware grant on line 408 and synchronizing with the software grant on line 410. In one embodiment, a hardware realization of the co-simulation block requires that the hardware access grant on line 408 be released immediately after the releasing of the hardware access request on line 404, as provided by the access manager 402.

Initially, the inputs on lines 404 and 410 are released with a deasserted value. The released value for the hardware access request on line 404 causes registers 412 and 414 to be reset, releasing the hardware access grant on line 408 and the software access request on line 406. The assertion of a hardware access request on line 404 combined with the continuing released value for the software access grant on line 410 causes register 414 to no longer be reset and to be enabled by clock enable on line 416 to latch the asserted data input on line 418. Thus, software access request on line 406 is asserted the cycle after the assertion of the hardware access request on line 404.

Eventually, the HLMS responds to the asserted software access request on line 406 with a software access grant on line 410. The combination of the asserted software access request on line 406 and the asserted software access grant on line 410 causes register 412 to be enabled by clock enable on line 420 to latch the asserted data input on line 422. Thus, hardware access grant on line 408 is asserted the cycle after the assertion of the software access grant on line 410.

After completing an operation, the hardware realization of the co-simulation block deasserts the hardware access request on line 404, immediately causing registers 412 and 414 to be reset, releasing the hardware access grant on line 408 and the software access request on line 406. The HLMS may have a delay interval before responding by deasserting the software access grant on line 410, but until the HLMS deasserts software access grant on line 410, register 414 is prevented by clock enable on line 416 from asserting another software access request on line 406, which in turn causes the clock enable on line 420 to prevent register 412 from asserting another hardware access grant on line 408.

Figure 5:
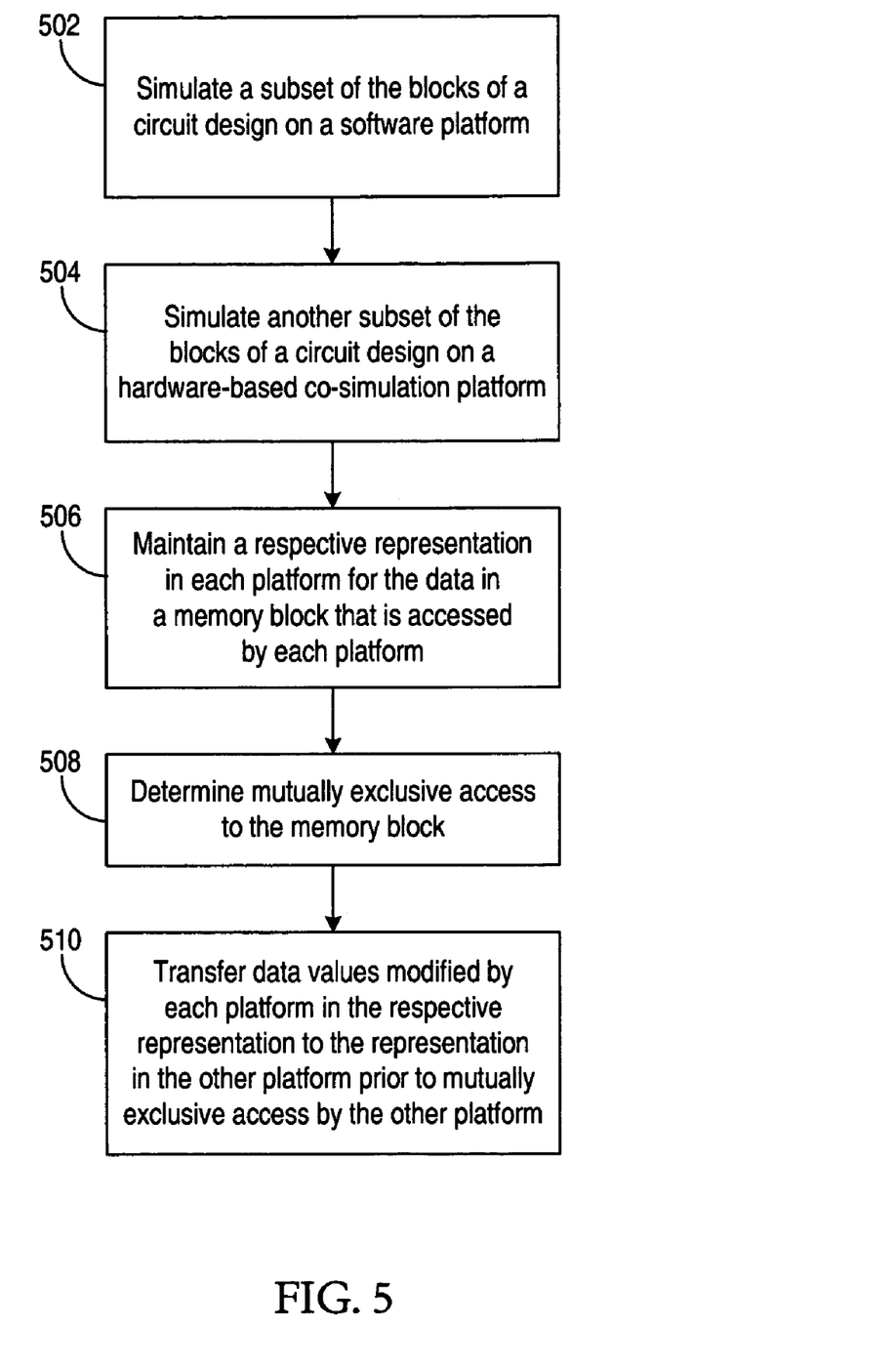
FIG. 5 is a flow diagram of a process for hardware co-simulation using shared memory, according to various embodiments of the invention.

FIG. 5 is a flow diagram of a process for hardware co-simulation using shared memory, according to various embodiments of the invention. Typically, one design block, which may be a block hierarchy, of a circuit design is selected to be simulated in hardware during hardware co-simulation, one or more shared memory blocks are simulated in a combination of hardware and software, and the remaining design blocks are simulated in software.

At step 502, a subset of the blocks of a circuit design is simulated on a software platform, typically in a HLMS on a general purpose computer. At step 504, another subset of the blocks of a circuit design is simulated in hardware on a hardware-based co-simulation platform. At step 506, a hardware representation and a software representation are maintained for the data in a memory block. The hardware representation is maintained in hardware memory on the hardware-based co-simulation platform and the software representation is maintained in memory on the software platform, such as lockable shared memory.

At step 508, mutually exclusive access to the data in the memory block is determined. Mutually exclusive access to the data may be provided by appropriate semaphore operations on the general purpose computer, such as may be provided by lockable shared memory. Mutually exclusive access to the data of a memory block may be split between the subset of the blocks simulated in software and the subset of the blocks simulated in hardware. In one embodiment, mutually exclusive access may be further split between the individual blocks of the subset of blocks simulated in software. While the blocks simulated in hardware are determined to have mutually exclusive access, the hardware-based co-simulation platform may access the data for the memory block using the hardware representation. While a block simulated in software is determined to have mutually exclusive access, the software platform may access the data for the memory block using the software representation.

At step 510, prior to mutually exclusive access to the data for the memory block from the hardware-based co-simulation platform, any of the data modified by the software platform is transferred from the software representation to the hardware representation. In addition, prior to mutually exclusive access to the data for the memory block from the software platform, and typically after the completion of a mutually exclusive access from the hardware-based co-simulation platform, any of the data modified by the hardware-based co-simulation platform is transferred from the hardware representation to the software representation.

The transferring of the data for the memory block between the hardware and software representations may use a burst data transfer to accomplish efficient data transfer. In one embodiment, the modified data may be transferred by unconditionally transferring all of the data for the memory block. In a second embodiment, the modified data may be transferred by transferring all of the data for the memory block if any of the data for the memory block is modified. In a third embodiment, the modified data may be transferred by transferring a contiguous range of locations for the memory block that includes all of the modified data. In a fourth embodiment, the modified data may be transferred by transferring a modification history including a sequence of pairings of location address and update value.

In an example simulation, the memory block may accessed by a producer, which writes to the memory block but does not read from the memory block, and a consumer, which reads from the data block but does not write to the memory block. If the producer is a block simulated on the software platform and the consumer is a block simulated on hardware-based co-simulation platform, step 510 need only transfer data from the software representation to the hardware representation. Conversely, if the producer is a block simulated on the hardware-based co-simulation platform and the consumer is a block simulated on software platform, step 510 need only transfer data from the hardware representation to the software representation.

The present invention is thought to be applicable to a variety of systems for hardware co-simulation and particularly applicable and beneficial in efficient hardware co-simulation for high data bandwidth applications, such as video processing. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for co-simulating a circuit design, comprising:
   simulating a first subset of blocks of the circuit design including a first block on a software-based co-simulation platform;
   wherein the simulating of the first subset of blocks is with software executing on the software-based co-simulation platform;
   simulating a second subset of the blocks of the circuit design including a second block on a hardware-based co-simulation platform having programmable logic circuitry that implements the second block; and
   maintaining coherency for a memory block of the circuit design between a first representation of data in the memory block on the software-based co-simulation platform and a second representation of the data in the memory block on the hardware-based co-simulation platform.

2. The method of claim 1, further comprising:
   providing access to data in the memory block for the first block using the first representation on the software-based co-simulation platform; and
   providing access to data in the memory block for the second block using the second representation on the hardware-based co-simulation platform.

3. The method of claim 2, wherein maintaining coherency comprises:
   providing mutually exclusive access to the memory block for the first block using the first representation in response to an access request from the first block, and for the second block using the second representation in response to an access request from the second block;
   transferring modified data in the memory block, as modified by the second block, from the second representation to the first representation prior to the providing mutually exclusive access for the first block; and
   transferring modified data in the memory block, as modified by the first block, from the first representation to the second representation prior to the providing mutually exclusive access for the second block.

4. The method of claim 1, wherein the second representation is random access memory (RAM) in the hardware-based co-simulation platform.

5. The method of claim 3, wherein providing mutually exclusive access includes mutually exclusive locking of the first representation in response to each access request from the first block and each access request from the second block.

6. The method of claim 5, wherein providing mutually exclusive access further includes granting access to the second representation for the second block in response to mutually exclusive locking of the first representation by the second block.

7. The method of claim 3, wherein the transferring of the modified data from the second representation includes burst transferring the modified data, wherein the data in the memory block has a plurality of values in respective addressable locations in the memory block, the burst transferring includes one or more transactions, and at least one of the transactions transfers a plurality of the values.

8. The method of claim 3, wherein the transferring of the modified data from the first representation includes burst transferring the modified data, wherein the data in the memory block has a plurality of values in respective addressable locations in the memory block, the burst transferring includes one or more transactions, and at least one of the transactions transfers a plurality of the values.

9. The method of claim 3, wherein the transferring of the data from the second representation to the first representation includes transferring both modified and unmodified data from the second to the first representation.

10. The method of claim 3, wherein the transferring of the data from the first representation to the second representation includes transferring both modified and unmodified data from the first to the second representation.

11. The method of claim 3, wherein the data in the memory block has a plurality of values in respective addressable locations in the memory block and transferring the modified data from the second representation includes transferring data values in a range of the addressable locations that include the modified data.

12. The method of claim 3, wherein the data in the memory block has a plurality of values in respective addressable locations in the memory block and transferring the modified data from the first representation includes transferring data values in a range of the addressable locations that include the modified data.

13. The method of claim 3, wherein transferring the modified data from the second representation includes transferring a modification history to the first representation for the modified data, wherein the modification history includes a sequence of address-value and data-value pairs descriptive of write accesses to the second representation.

14. The method of claim 3, wherein transferring the modified data from the first representation includes transferring a modification history to the second representation for the modified data, wherein the modification history includes a sequence of address-value and data-value pairs descriptive of write accesses to the first representation.

15. A co-simulation system for simulating a circuit design, comprising:
   a software-based co-simulation platform including a first memory arrangement, the software-based co-simulation platform adapted to represent a memory block of the circuit design using the first memory arrangement, simulate a first block of the circuit design accessing data of the memory block using the first memory arrangement, and manage mutually exclusive access to the memory block from the first block and a second block of the circuit design;
   wherein the software-based co-simulation platform simulates the first block with software executing on the software-based co-simulation platform;
   a hardware-based co-simulation platform coupled to the software-based co-simulation platform and including a second memory arrangement, the hardware-based co-simulation platform adapted to represent the memory block using the second memory arrangement and simulate the second block accessing the data of the memory block using the second memory arrangement; and
   wherein the hardware-based co-simulation platform simulates the second block on a programmable logic device (PLD) of the hardware-based co-simulation platform.

16. The co-simulation system of claim 15, wherein the software-based co-simulation platform is further adapted to transfer the data that is modified by the second block from the second memory arrangement to the first memory arrangement prior to provision of mutually exclusive access for the first block.

17. The co-simulation system of claim 15, wherein the software-based co-simulation platform is further adapted to transfer the data that is modified by the first block from the first memory arrangement to the second memory arrangement prior to provision of mutually exclusive access for the second block.

18. The co-simulation system of claim 16, wherein the software-based co-simulation platform is further adapted to transfer the data that is modified by the first block from the first memory arrangement to the second memory arrangement prior to provision of mutually exclusive access for the second block.

19. The co-simulation system of claim 18, wherein the hardware-based co-simulation platform includes a programmable logic device (PLD) adapted to simulate of the second block, wherein the PLD includes the second memory arrangement.

20. A co-simulation system for simulating a circuit design, comprising:

means for simulating on a software-based co-simulation platform a first subset of blocks of the circuit design including a first block;

wherein the simulating of the first subset of blocks is with software executing on the software-based co-simulation platform;

means for simulating a second subset of the blocks of the circuit design including a second block, on a hardware-based co-simulation platform having programmable logic circuitry that implements the second block;

means for maintaining coherency for a memory block of the circuit design between a first representation of data in the memory block on the software-based co-simulation platform and a second representation of the data in the memory block on the hardware-based co-simulation platform;

means for accessing the data in the memory block by the first block using the first representation on the software-based co-simulation platform; and means for accessing the data in the memory block by the second block using the second representation on the hardware-based co-simulation platform.

\* \* \* \* \*